United States Patent Office 3,513,470
Patented May 19, 1970

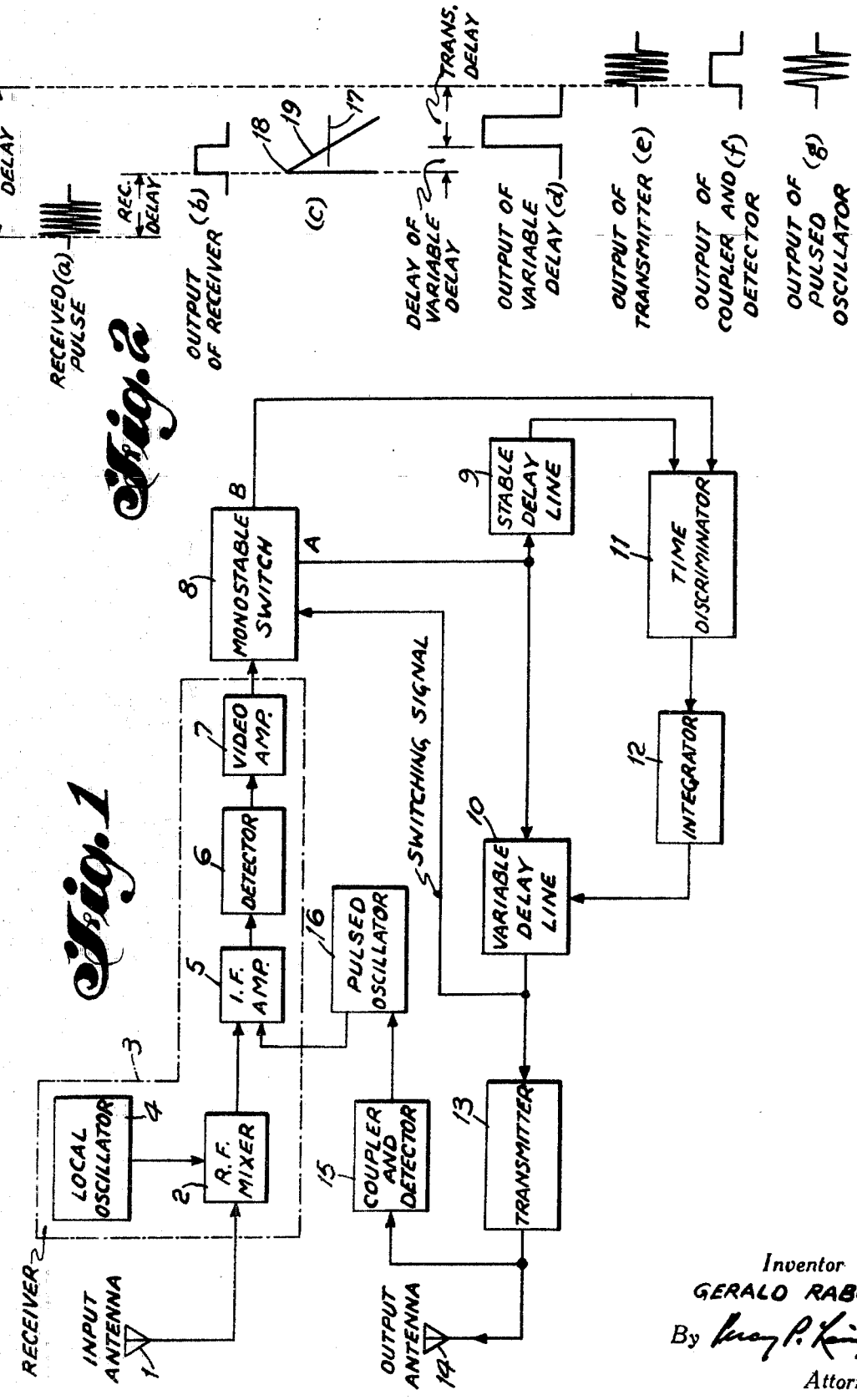

3,513,470
RADIO TRANSPONDER
Gerald Rabow, Brooklyn, N.Y., assignor to International Telephone and Telegraph Corporation, a corporation of Delaware
Filed July 7, 1958, Ser. No. 747,559
Int. Cl. G01s 9/56
U.S. Cl. 343—6.8                6 Claims This invention relates to transponders and more particularly to a stabilized delay transponder.

The radar beacon or radio transponder in an aerial navigation system is arranged to respond to a trigger signal propagated by the interrogator-response unit carried in the aircraft whose position is to be determined with respect to the beacon. In response to the triggering signal, the beacon emits a reply signal which is subsequently received by the unit of the system carried by the aircraft. Two such radar beacons may be spaced apart at known locations in order to provide two ranges to known reference points from which ranges the aircraft is enabled to accurately fix its position with respect to the fixed location of the beacons. The ranges obtained in this manner are a direct function of the time elapsing between the transmission of the interrogation pulse by the aircraft and the reception by the aircraft of the reply pulse propagated by the beacons. The beacon circuits, however, necessarily introduce a delay between the time of reception of the interrogating signal and the transmission of the reply signal. Consequently, the indicated range to the beacon will be in error in distance corresponding to the time delay of the circuits unless a corresponding compensation is made in the unit of the system carried by the aircraft. This can be satisfactorily accomplished when the delay introduced by the beacon is a known and constant value. There is an uncertainty in the time delay in both the receiver and transmitter due to fluctuations in temperature, input signal strength and other varying conditions. When the transponder is used as part of a highly accurate range measuring system it is necessary to have the time delay between the received pulse and the transmitter pulse accurately fixed.

It is, therefore, an object of this invention to provide a means for accurately stabilizing the time delay between the input and output pulses of a transponder.

It is a further object to provide a radar beacon of a high degree of accuracy by stabilizing the delay between the received pulses and transmitted pulses thereof.

A feature of this invention is a transponder having a receiver and a transmitter for the transmission of pulse signals separated from received pulse signals by a given time period, which comprises means to detect a first envelope of the received pulse signals and delay means coupling the received signal envelope to the transmitter to trigger the transmitter. There is provided means which, in association with the detecting means derives from a portion of the transmitted pulse output a second envelope of transmitted pulse signals, and means for comparing the time difference between the first and second envelopes to obtain a control voltage therefrom. This control voltage is fed to the delay means to adjust the delay between the received pulse and the transmitted pulse to coincide with the given time period.

A further feature of this invention is that the first envelope is detected from the intermediate frequency signal of the received signal pulse and the second envelope is derived from the radio frequency transmitted signal by suitable detection means. Means are provided to compare the time difference between the first and second envelope to derive a control voltage which is fed to the delay means to adjust the delay between the first and second envelope to coincide with the desired given time period.

The above-mentioned and other features and objects of this invention will become more apparent by reference to the following description taken in conjunction with the accompanying drawings, in which:

FIG. 1 is a block diagram of an embodiment of this invention; and

FIG. 2 is a graph of the waveforms occuring at different points in the block diagram.

With reference to FIG. 1, there is shown an input antenna 1 which is coupled to an R.F. mixer 2 of a receiver 3. The output of the local oscillator 4 is likewise coupled to the mixer 2 and the resulting intermediate frequency signal output of the mixer 2 is fed into an intermediate frequency amplifier 5. The output of the intermediate frequency amplifier 5 is coupled to the input of a detector 6 and the output of the detector 6 is fed to a video amplifier 7. A monostable switch 8 couples the output of the video amplifier 7 to a stable delay circuit 9 composed of inductive and capacitive elements to give a desired delay time, a variable delay circuit 10 such for example as described in the RCA Engineer, vol. 2, No. 4, December 1956–January 1957 on pp. 46–47, FIG. 11, published by Radio Corporation of America, Camden, N.J. and a time discriminator 11. The output of the stable delay circuit 9 is likewise coupled to the time discriminator 11. An integrator 12 couples the outpu t of the time discriminator 11 to the variable delay circuit 10. The output pulse of the variable delay circuit 10 is coupled to a transmitter 13 and to the monostable switch 8. The radio frequency pulse output of the transmitter 13 is then fed to an output antenna 14. A portion of the output pulse is taken off and fed into a coupler and detector 15. The output of the coupler and detector 15 is coupled to a pulsed oscillator 16 and the output of the pulsed oscillator 16 is fed into the intermediate frequency amplifier 5.

In the operation of this circuit the received pulse $a$ of FIG. 2 is heterodyned down in the mixer 2 to the inter- 2 to the intermediate frequency which is amplifier in the amplifier 5. The detector 6 detects the envelope of the intermediate frequency pulse as shown in the waveform $b$. This pulse is passed by the monostable switch 8 and emerges at point A to be fed into the variable delay circuit 10 and the stable delay circuit 9. The first pulse so received will go through the variable delay circuit 10 where it is delayed for a certain time as determined by the delay of the variable delay line to emerge as a delayed pulse $d$, FIG. 2, and trigger the magnetron (not shown) of the transmitter 13 so that the transmitter generates a radio frequency pulse $e$. This pulse is then radiated through the antenna 14. A portion of the transmitted pulse $e$ is taken off and fed into the coupler and detector 15 where it is converted into a video pulse $f$. The video pulse $f$ is injected into the pulsed oscillator where it is converted into a pulse $g$, having the intermediate frequency of the intermediate frequency amplifier 5. This transmitted intermediate frequency pulse $g$, is then injected into the I.F. amplifier 5 and from the detector 6 and the video amplifier 7 emerges as a video pulse similar to the pulse $b$, but having the delay imposed thereon by the variable delay circuit 10, and delays in the receiver 3 and the transmitter 13. Any delay that may be present in the coupler and detector 15 and the pulse oscillator 16 is negligible and may be disregarded for the purpose of this invention. This is clearly shown in FIG. 2 where no delay has been inserted between the pulses $e$, $f$, and $g$. The monostable switch 8, which is normally conducting in the A position has received a portion of the output signal of the variable delay circuit 10 and is switched over to position B from whence the delayed transmitted pulse emerges to be injected into the time discriminator 11. The received video pulse $b$ which has been fed into the stable delay circuit 9 has been delayed therein by a time period which is equal to the desired time delay of the system or to the sum of the delays of the receiver 3, the transmitter 13 and the variable delay circuit 10. The delayed received pulse is fed into the time discriminator where it is compared with the transmitted pulse output of the monostable switch and an error voltage results if there is a time difference between the pulses. The error voltage output of the time discriminator 11 is fed into the integrator 12. The output of the integrator when it is not affected by any error voltage output of the time discriminator is a D.C. voltage level 17 shown in waveform c of FIG. 2. When the pulse b is injected into the variable delay circuit 10 it initiates the waveform c which has a substantially vertical rise up to the level 18 from whence it delays along the downward slope 19. When the slope 19 crosses the voltage level 17 then the variable delay circuit 10 generates the pulse d which as stated before triggers transmitter 13. If the transmitted pulse output of the switch 8 were to occur ahead of the delayed received pulse output of the stable delay 9, the error voltage output of the time discriminator would be negative and would decrease the voltage level 17 so that the start of the output pulse d of the variable delay circuit 10 would occur later. If the transmitted pulse were to lag the output pulse of the stable delay circuit 9 then a positive error voltage of the time discriminator 11 would occur which would raise the operating voltage level 17 so that the delayed pulse output of the variable delay circuit 10 would occur at an earlier time.

While I have described above the principles of my invention in connection with specific apparatus, it is to be clearly understood that this description is made only by way of example and not as a limitation to the scope of my invention as set forth in the objects thereof and in the accompanying claims.

I claim:

1. A radio transponder having a receiver and a transmitter for the transmission of pulse signals separated from received pulse signals by a given time period, comprising means to detect a first envelope of each of the pulse signals received by said receiver, delay means coupling said received signal envelope to said transmitter to trigger said transmitter, means associated with said detecting means for deriving from a portion of the transmitted pulse output a second envelope of each of the transmitted pulse signals, means for comparing the time difference between said first and second envelopes to derive a control voltage and means coupling said control voltage to said delay means to adjust the delay between received pulse signals and transmitted pulse signals to coincide with said given time period.

2. A radio transponder having a receiver and a transmitter for the transmission of pulse signals separated from received pulse signals by a given time period, comprising means to detect a first envelope of each of the pulse signals received by said receiver from the intermediate frequency signal thereof, delay means coupling the received signal envelopes to said transmitter to trigger said transmitter, means for producing from a portion of each transmitted pulse output an intermediate frequency signal for application to said detecting means to detect a second envelope of each of the transmitted pulse signals, means for comparing the time difference between said first and second envelopes to derive a control voltage therefrom and means coupling said control voltage to said delay means to adjust the delay between received pulse signals and transmitted pulse signals to coincide with said given time period.

3. A radio transponder according to claim 2 wherein said delay means comprise a variable delay circuit and said comparing means includes a fixed delay circuit having a delay equal to said given time period.

4. A radio transponder according to claim 3 wherein said first envelope is coupled to said fixed delay circuit and the output of said fixed delay circuit is compared with said second envelope to derive a control voltage proportional to the time difference therebetween.

5. A radio transponder having a receiver and a transmitter for the transmission of pulse signals separated from received pulse signals by a given time period comprising first means to detect from the intermediate frequency of received signals a first envelope signal, a variable delay circuit, a fixed delay circuit having a delay equal to said given time period, switching means coupling said first envelope signal to said delay circuits, means coupling the output of said variable delay circuit to said transmitter to trigger said transmitter, means to produce from a portion of the output of said transmitter intermediate frequency pulse signals, means coupling said intermediate frequency transmitter pulse signals to said detecting means to derive a second envelope signal, a time discriminator, said switching means coupling said second envelope signal to said time discriminator, means coupling the output of said fixed delay circuit to said time discriminator to derive an error voltage proportional to the time difference between said first and second envelope signals, and an integrator coupling the output of said discriminator to said variable delay circuit to vary the delay characteristics thereof to coincide with the delay time of said fixed delay circuit so that each transmitted pulse signal will follow each corresponding received pulse signal by said given time period.

6. A radio transponder having a receiver and a transmitter for the transmission of pulse signals separated from received pulse signals by a given time period, said receiver and said transmitter having delays therein, comprising means to detect a first envelope of each of the pulse signals received by said receiver from the intermediate frequency signal thereof, a variable delay circuit coupling the received signal envelopes to said transmitter to trigger said transmitter, means for producing from a portion of each transmitted pulse output an intermediate frequency signal for application to said detecting means to detect a second envelope of each of the transmitter pulse signals, means for applying said first envelope signals to a fixed delay circuit having a delay equal to said given time period, means for comparing the time difference between said delayed first envelopes and said second envelopes to derive a control voltage therefrom, and means coupling said control voltage to said variable delay circuit to adjust the delay of said variable delay circuit so that the sum of the delays of said variable delay circuit, said transmitter and receiver is equal to said fixed delay, and said transmitted pulse signal will follow each corresponding received pulse signal by said given time period.

References Cited

UNITED STATES PATENTS

| 2,646,510 | 7/1953 | Musselman | 343—103 |
| 2,671,897 | 3/1954 | Woodbury | 343—101 |

RICHARD A. FARLEY, Primary Examiner

M. F. HUBLER, Assistant Examiner